United States Patent
Lin

(10) Patent No.: US 8,529,092 B2
(45) Date of Patent: Sep. 10, 2013

(54) ASSEMBLED TYPE LAMP WALL

(76) Inventor: Ming-Tsun Lin, Zhubei (TW)

( * ) Notice: Subject to any disclaimer, the term of this patent is extended or adjusted under 35 U.S.C. 154(b) by 0 days.

(21) Appl. No.: 13/491,696

(22) Filed: Jun. 8, 2012

(65) Prior Publication Data

US 2013/0170211 A1 Jul. 4, 2013

(30) Foreign Application Priority Data

Dec. 29, 2011 (TW) .............................. 100224897 U

(51) Int. Cl.
*F21V 21/00* (2006.01)

(52) U.S. Cl.
USPC ............ 362/249.03; 362/249.06; 362/249.07; 362/1

(58) Field of Classification Search
USPC ... 362/1, 238, 239, 285, 418, 249.01–249.03, 362/249.07, 249.11, 249.06
See application file for complete search history.

(56) References Cited

U.S. PATENT DOCUMENTS

| | | | | |
|---|---|---|---|---|
| 4,447,859 | A | * | 5/1984 | Raczynski ....................... 362/13 |
| 4,602,448 | A | * | 7/1986 | Grove .............................. 40/541 |
| 5,276,598 | A | * | 1/1994 | Hedenstrom et al. ......... 362/238 |
| 5,658,068 | A | * | 8/1997 | Fritts ............................. 362/225 |

* cited by examiner

Primary Examiner — Thomas Sember
(74) Attorney, Agent, or Firm — Jackson IPG PLLC

(57) ABSTRACT

An assembled type lamp wall comprises a base, at least one fastening holder and at least one lamp panel, wherein the fastening holder has a fitting portion provided for joining the base and a bottom portion that is stably in contact with ground. The fitting portion of the fastening holder is disposed with at least one screw through hole. The base has a plurality of screw holes aligning the at least one screw through hole and respectively and circularly disposed at a location of joining the fastening holder so that the several lamp panels can be horizontally extended and arranged on the base, and other screw holes align the screw through holes on the fastening holder, and a purpose of easily regulating the lamp panels 30 can be easily achieved by means of screwing the screw into the screw hole.

5 Claims, 5 Drawing Sheets

ASSEMBLED TYPE LAMP WALL

BACKGROUND OF THE INVENTION

1. Field of the Invention

The present invention generally relates to an illumination device, in particular to an assembled type lamp wall that is conveniently assembled and extended by users and capable of conveniently allowing the user to regulate angles of lamp panels.

2. Description of the Related Art

As everyone knows, nutrient required for growing plants is synthesized by relying upon photosynthesis. Proper illumination may affect physiology reaction of plants. In a process of culturing plant tissues, semi-sealed cultivate environment is necessary to prevent the intrusion of outside pollution sources. Under the semi-sealed condition, proper illumination deeply affects the quality of tissue cultivation.

So far, a conventionally frequent-used illumination system is to construct a truss structure as a scaffold onto a region of cultivating plants. Several illumination lamps then are disposed on the truss structure. A purpose of controlling illumination condition can be achieved by means of irradiating the region of cultivating plants through light sources generated by the illumination lamps.

The foregoing illumination light sources are suitable for planar cultivation manner since normal light beam is unable to generate illumination effect for the rear region of shielded articles. Consequently, the utilization of ground space may be waste. Moreover, to satisfy the demand of straight type cultivation, the illumination lamps can be arranged at sides of plants. Since a structural body for use in supporting the illumination lamp lacks of quickly and stably installing the illumination lamp and the design of regulating the illumination lamp. The angle and location of illumination source may not be easily changed according to actual demand. Consequently, the practicality and convenience may not be obviously improved.

SUMMARY OF THE INVENTION

Therefore, it is an objective of the present invention to provide an assembled type lamp wall that is conveniently assembled and extended by users and capable of conveniently allowing the user to regulate angles of lamp panels.

To achieve the foregoing objective, the present invention provides an assembled type lamp wall basically comprises a base, at least one fastening holder and at least one lamp panel; wherein a main body of the base is disposed with at least one first inserting slot arranged along an axis of the base. The fastening holders are fixedly mounted at two sides of the base. Each fastening holder has a fitting portion provided for joining the base and a bottom portion that is stably in contact with ground. The at least one lamp panel is disposed with at least one light emitting element on a panel member, and at least one side of the panel member is disposed with an embedding portion capable of joining the first inserting slot. The fitting portion of each fastening holder is disposed with at least one screw through hole. The base has a plurality of screw holes aligning the at least one screw through hole and respectively and circularly disposed at a location of joining the fastening holder so that the fastening holders and the base can be locked and combined together by utilizing screws.

By utilizing the foregoing structure features, several lamp panels can be horizontally extended and arranged on the base, and other screw holes align the screw through holes on the fastening holder by rotating the base, and a purpose of easily regulating angles of the lamp panels can be easily achieved by means of screwing the screw into the screw hole.

According to the foregoing main structure features, the assembled type lamp wall further comprises at least one engagement holder and at least two lamp panels, wherein at least two corresponding sides of the panel member of each lamp panel are respectively disposed with an embedding portion capable of joining the first inserting slot of the base. The engagement holder is disposed with a plurality of second inserting slots 41 along an axis arrangement of the engagement holder and provided for joining the embedding portion of each lamp panel.

The first inserting slot and the second inserting slot are T-shaped cross section, and the sliding mechanism of each lamp panel is a T-shaped cross section for correspondingly inserting and fitting the first inserting slot and the second inserting slot.

The fitting portion of the fastening holder is disposed with a gap for exposing the first inserting slot of the base.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
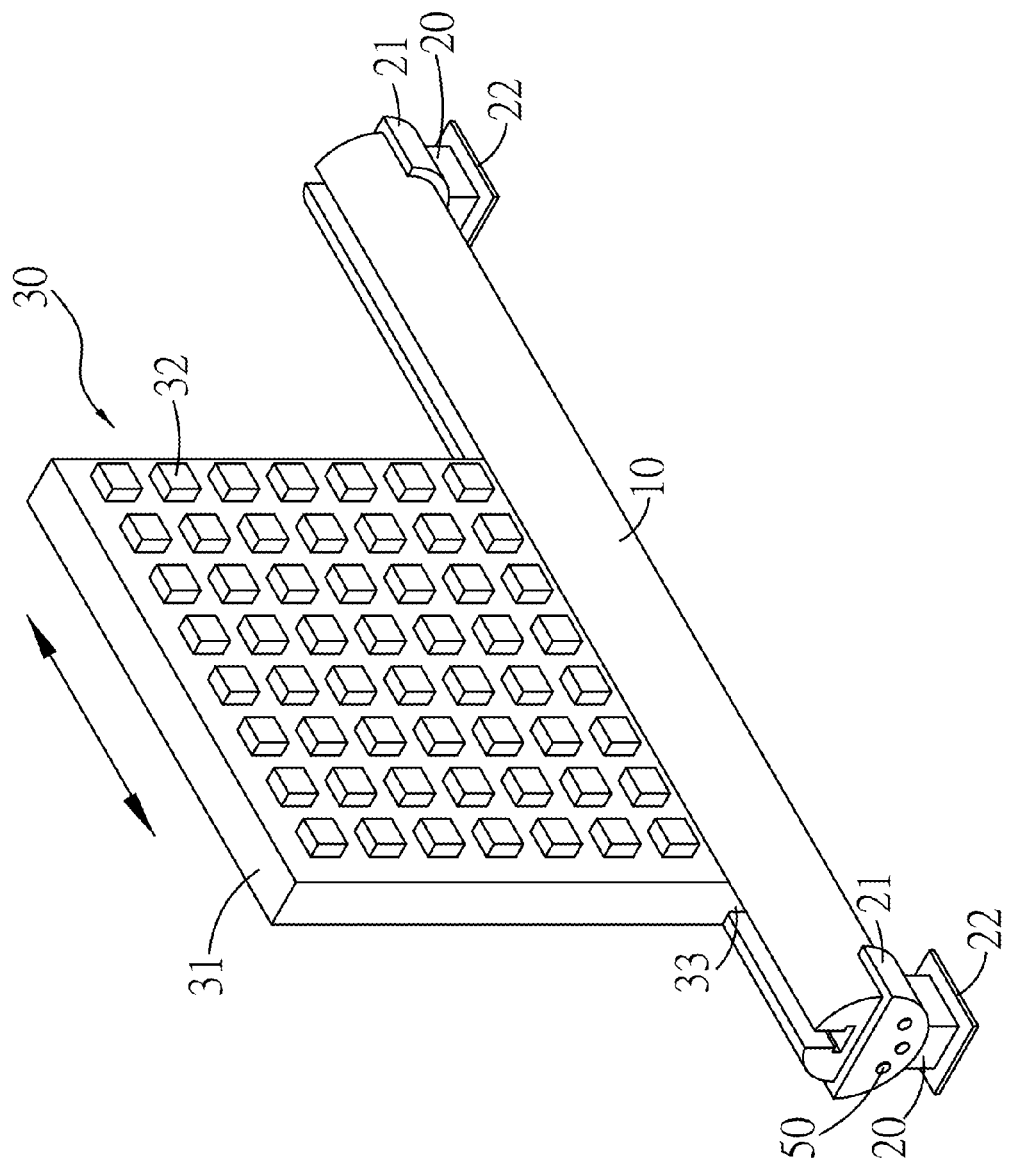
FIG. 1 is a three-dimensional drawing of an appearance of an assembled type lamp wall according to a first embodiment of the present invention.
Figure 2:
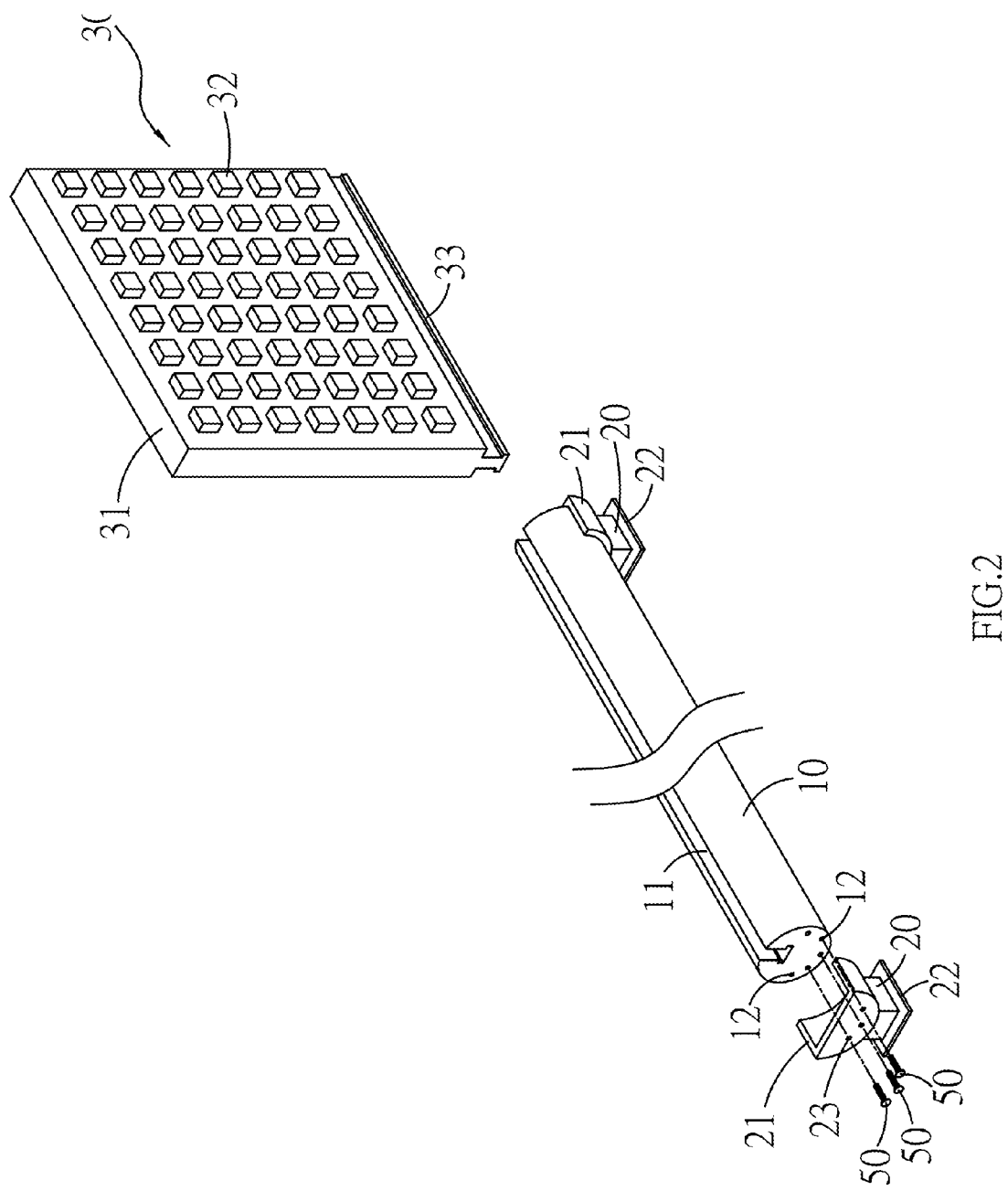
FIG. 2 is a decomposition drawing of an assembled type lamp wall according to a first embodiment of the present invention.

With reference to FIG. 1 and FIG. 2 for a three-dimensional diagram of an assembled type lamp wall according to a first embodiment of the invention and a decomposition drawing of an assembled type lamp wall according to a first embodiment of the invention, the assembled type lamp wall of the invention basically includes a base 10, at least one fastening holder 20 and at least one lamp panel 30.

The base 10 is a strip shaped aluminum extrusion structure body, wherein at least one first inserting slot 11 is disposed on its main body along an axis of the base 10.

The fastening holders 20 respectively fasten two ends of the base 10. Each fastening holder 2 has a fitting portion 21 for joining the base 10 and a bottom portion 22 that is stably in contact with ground. While in the embodiment, the fitting potion 21 of the fastening holder is disposed with a gap (or a notch) for exposing the first inserting slot 11 of the base 10.

The at least one lamp panel 30 is disposed with at least one light emitting element 32 on a panel member 31, and at least one side of the panel member 31 is disposed with an insertion portion 33 for joining the first inserting slot 11

The fitting portion 21 of the fastening holder 20 is disposed with at least one screw through hole 23. The base 10 has a plurality of screw holes 12 aligning the at least one screw through hole 23 and respectively and circularly disposed at a location of joining the fastening holder 20 so that the fastening holders 20 and the base 10 can be locked and combined together by utilizing screws 50.

Principally, while using the assembled type lamp wall of the invention, several lamp panels 30 can be horizontally extended and arranged on the base 10, and other screw holes 12 align the screw through holes 23 on the fastening holder 20 by rotating the base 10, and a purpose of easily regulating angles of the lamp panels 30 can be achieved by means of screwing the screw 50 into the screw hole 12.

Figure 3:
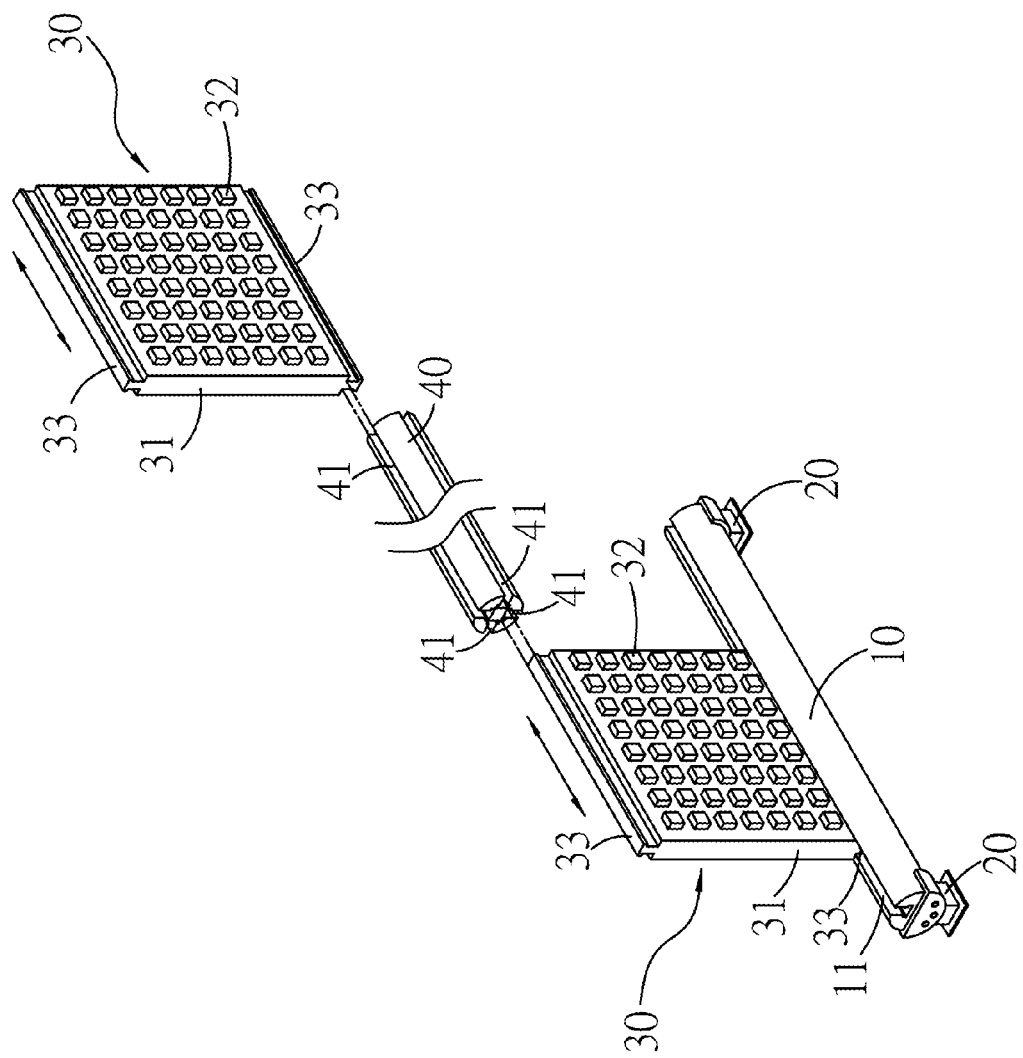
FIG. 3 is a decomposition drawing of an assembled type lamp wall according to a second embodiment of the present invention.
Figure 4:
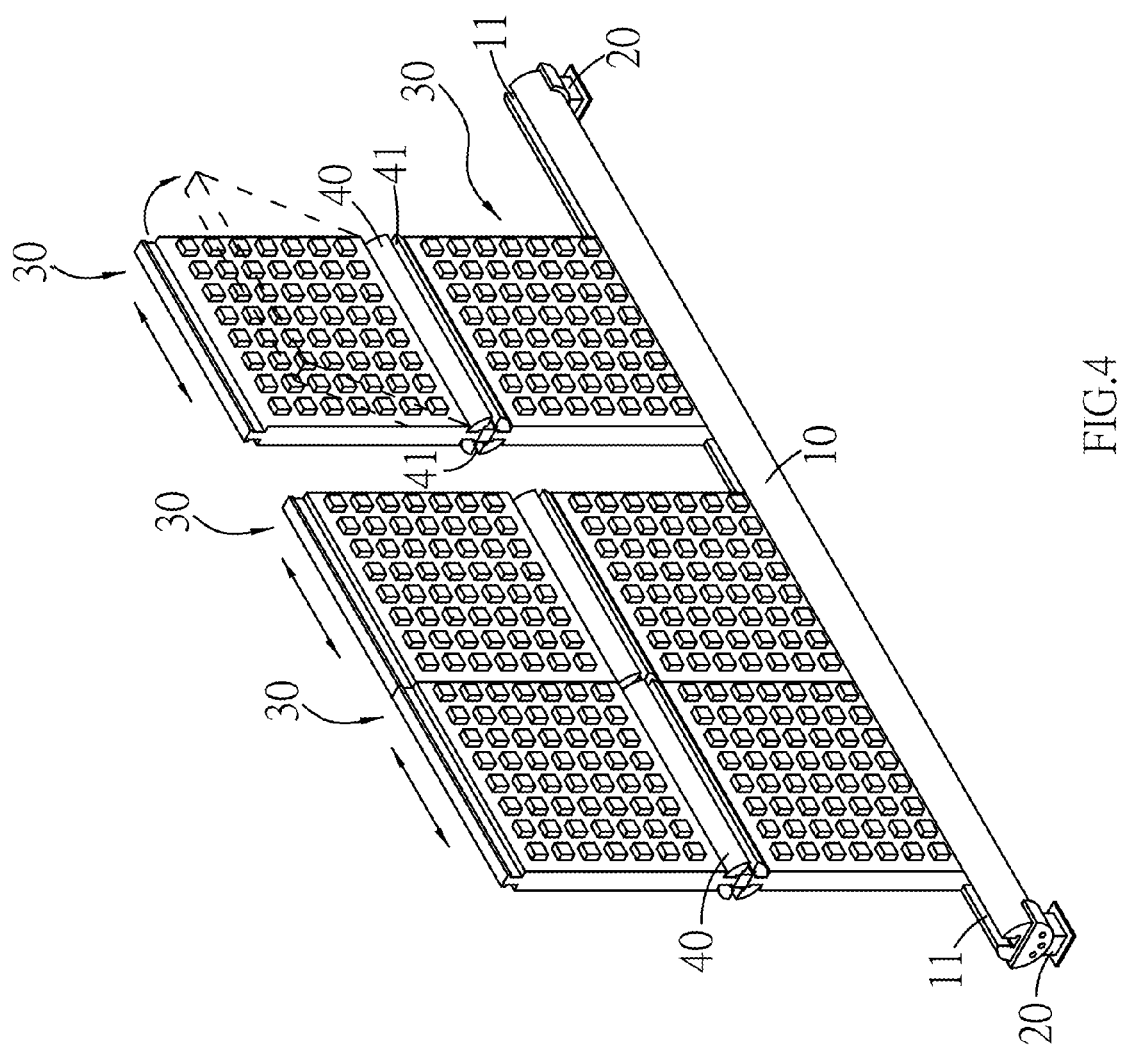
FIG. 4 is a three-dimensional drawing of an appearance of an assembled type lamp wall according to a second embodiment of the present invention.
Figure 5:
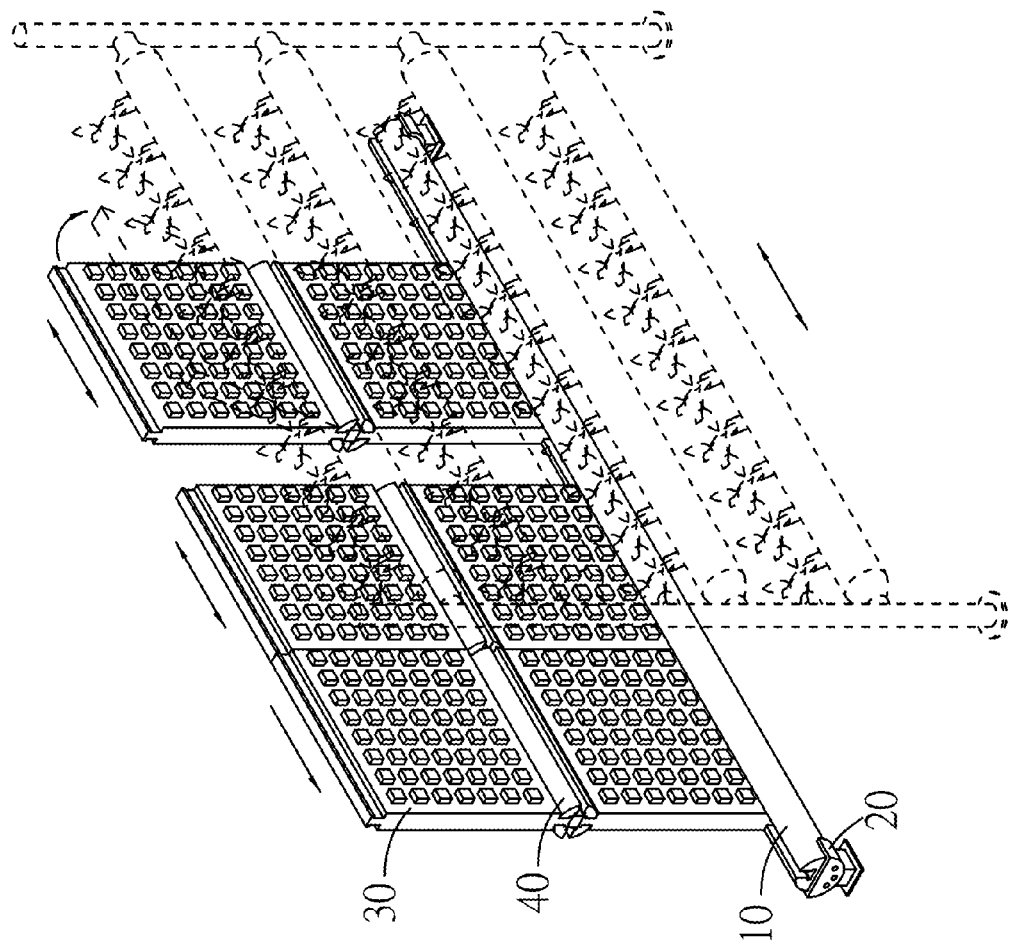
FIG. 5 is a schematic diagram of an assembled type lamp wall according to a second embodiment of the present invention.

With reference to FIG. 3 and FIG. 4, the assembled type lamp wall of the invention can further include at least one engagement holder 40 and at least two lamp panels 30, wherein at least two corresponding sides of the panel member 31 of each lamp panel 30 are respectively disposed with an embedding portion 33 capable of joining the first inserting slot 11 of the base 10. The engagement holder 40 is disposed with a second inserting slot 41 along an axis arrangement of the engagement holder 40 and provided for joining the embedding portion 33 of each lamp panel 30.

Accordingly, several layers of lamp panels 30 can be upwardly extended and arranged by varying in amount of engagement holders 40 and the lamp panels 30 based upon actual demands. Of course, under the using state, the user can quickly regulate the lateral location of the lamp panels 30 by means of simply pushing the lamp panel 30. Angles of each layer of lamp panels 30 can be regulated by selectively inserting the lamp panel 30 into other second inserting slot 41.

Moreover, the first inserting slot 11 of the base 10 and the second inserting slots 40 of each engagement holder 40 are T-shaped cross section. Each embedding portion 33 of each lamp panel 30 is also a T-shaped cross section provided for correspondingly inserting and fitting the first inserting slot 11 and the second inserting slot 41 to prevent the lamp panel 30 from coming off the rod body of the base 10 or the engagement holder 40 when each lamp panel 30 joins the base 10 or the engagement holder 40.

By comparing with the conventional structure, the assembled type lamp wall of the invention can use simple inserting manner to stably mount the lamp panel on the base or the engagement holder. Further, based upon actual using demand, different amount of lamp panels can be selectively and laterally extended and arranged on the base, and the lateral location and angles of the lamp panels can be regulated. More specifically, several layers of lamp panels are upwardly extended and arranged by varying in amount of engagement holders and lamp panels. The horizontal location and angles of each layer of lamp panel can be regulated according to actual demand. Therefore, the invention is specifically suitable for illumination condition of controlling plants. The planting to be cultured can be planted by adopting the manner of straight line arrangement to achieve the purpose of effectively utilizing the space.

While the means of specific embodiments in a preferable assembled type lamp wall of present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An assembled type lamp wall comprising:
   a base, a main body of the base disposed with at least one first inserting slot arranged along an axis of the base;
   at least one fastening holder fixedly disposed to the main body of the base, the fastening holder having a fitting portion provided for joining the base and a bottom portion provided for being stably in contact with a locking surface;
   at least one lamp panel constructing at least one light emitting element on a panel member, and a sliding mechanism, which engages with the first inserting slot, disposed at least one side of the panel member,
   wherein the assembled type lamp wall further comprises at least one engagement holder and at least two lamp panels; and
   at least two corresponding sides of the panel member of each lamp panel are respectively disposed with a sliding mechanism capable of joining the first inserting slot of the base; and
   the engagement holder is disposed with a plurality of second inserting slots on the main body along an axis arrangement of the engagement holder and provided for joining the sliding mechanism of each lamp panel,
   wherein the first inserting slot and the second inserting slot are T-shaped cross section, and the sliding mechanism of each lamp panel is a T-shaped cross section for correspondingly inserting and fitting the first inserting slot and the second inserting slot.

2. The assembled type lamp wall of claim 1, wherein the fitting portion of the fastening holder is disposed with at least one screw through hole, and the base has a plurality of screw holes aligning the at least one screw through hole and respectively and circularly disposed at a location of joining the fastening holder so that the fastening holders and the base can be locked and combined together by utilizing screws.

3. The assembled type lamp wall of claim 1, wherein the fitting portion of the fastening holder is disposed with a gap for exposing the first inserting slot of the base.

4. The assembled type lamp wall of claim 1, wherein the sliding mechanism is an embedding block.

5. The assembled type lamp wall of claim 1, wherein the light emitting element is a LED or a lamp.

* * * * *